3,294,111
RELIEF VALVE

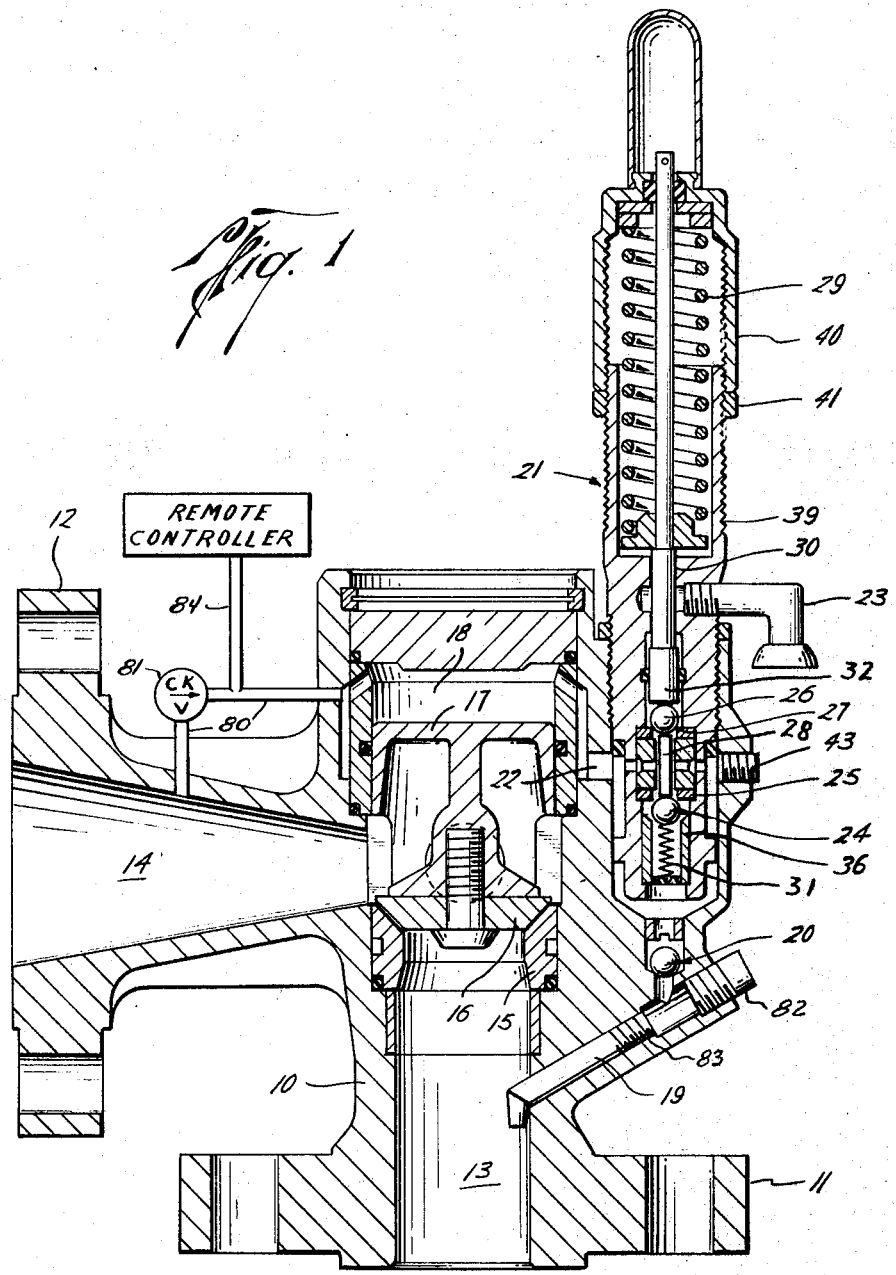
Bolling A. Abercrombie
Joseph W. Taylor
INVENTORS

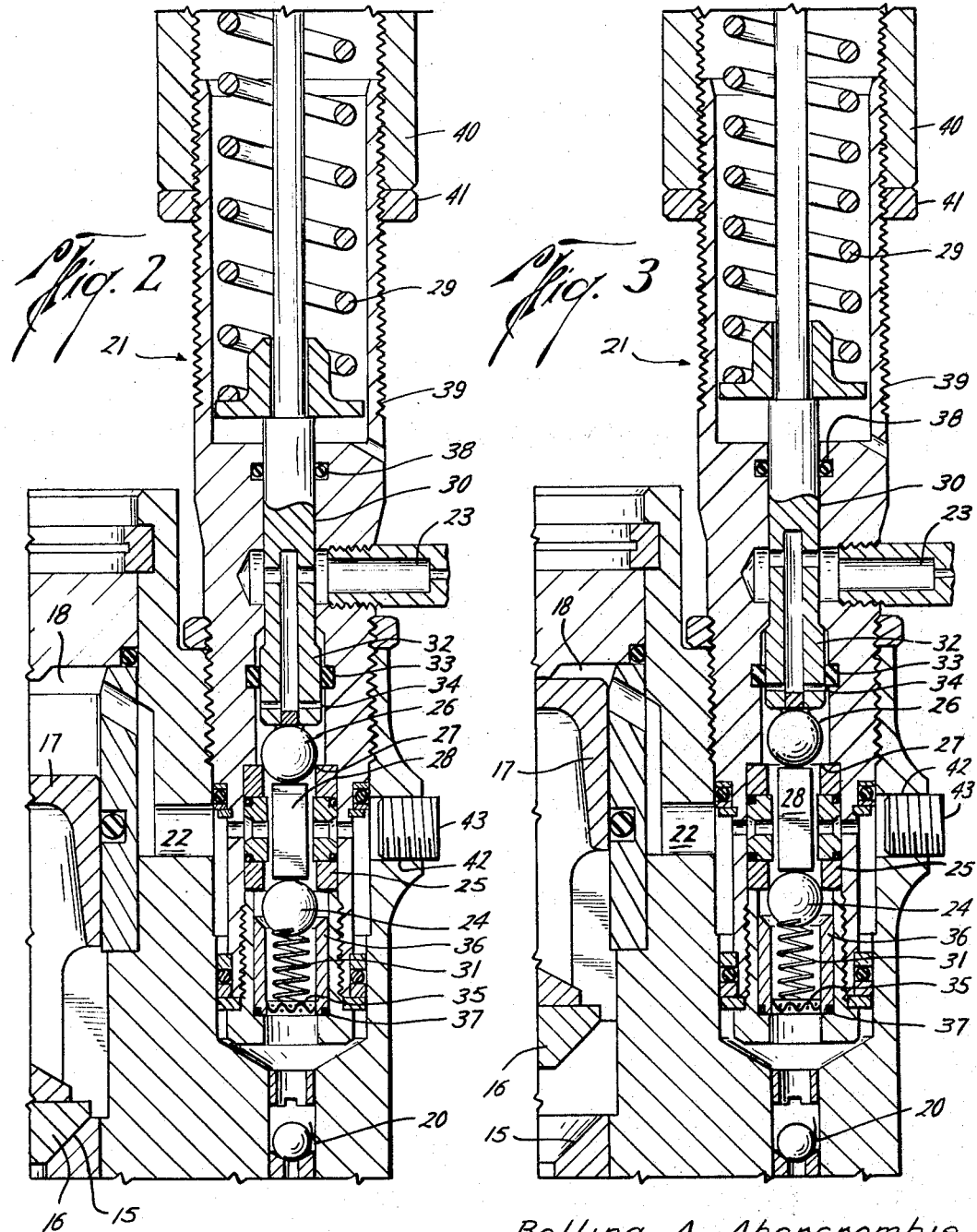

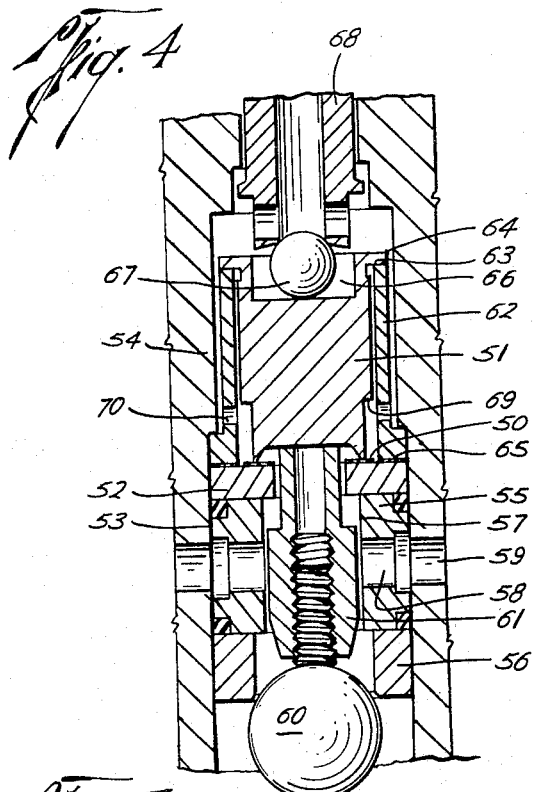
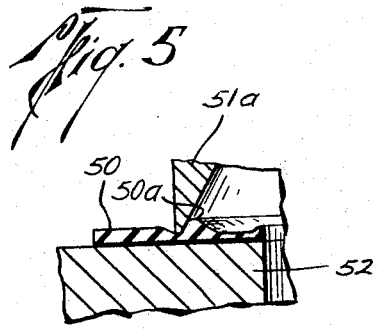
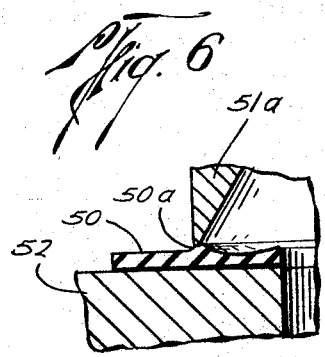
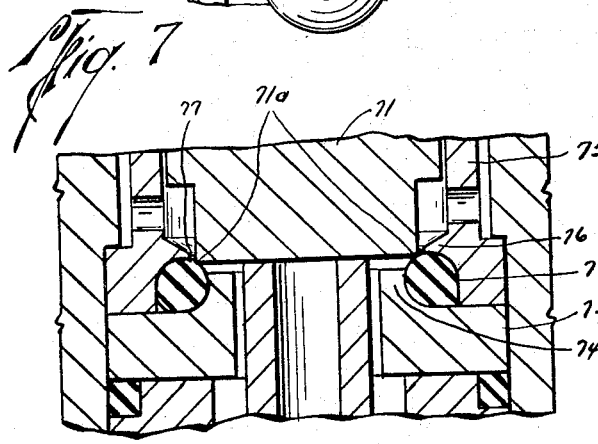
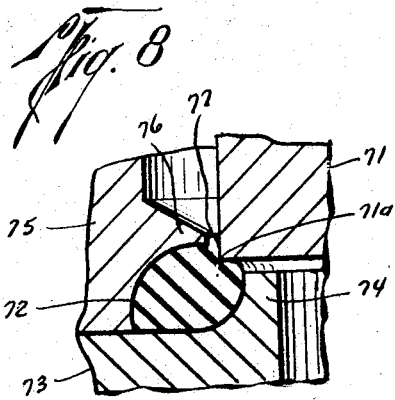
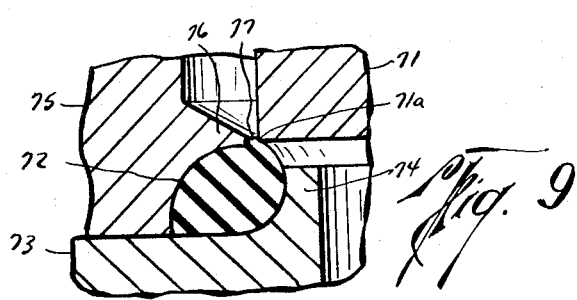
Bolling A. Abercrombie
Joseph W. Taylor
INVENTORS

Bolling A. Abercrombie and Joseph W. Taylor, Houston, Tex., assignors to U.S. Industries, Inc., New York, N.Y.
Continuation of application Ser. No. 296,273, July 19, 1963. This application June 1, 1965, Ser. No. 460,097
3 Claims. (Cl. 137—492)

This is a continuation of our application Ser. No. 296,273, filed July 19, 1963 and entitled "Relief Valve."

This invention relates to improvements in pressure relief valves and refers more particularly to the class of relief valves of the differential piston type. In another of its aspects, it relates to a relief valve of this general class and the novel pilot means for controlling the same.

Pressure relief valves of this type have a valve member which engages a seat and closes the passageway through which the fluid being controlled can escape and which is held against the seat by pressure responsive means comprising a pressure chamber and a piston. The piston has a pressure area larger than the effective area of the valve member which allows it to hold the valve against the seat as long as the pressure in the chamber equals the pressure of the fluid being controlled. The pressure in the chamber is maintained equal to the pressure of the fluid being controlled by simply connecting the chamber to the vessel containing the pressure fluid. Pilot exhaust valve means are used to open the chamber and exhaust the fluid therein when the pressure of the fluid being controlled reaches a predetermined amount. This allows the valve member of the relief valve to move away from the seat, permitting the controlled pressure fluid to escape. Pilot inlet valve means are used to repressure the chamber when the pressure of the pressure fluid being controlled drops to a predetermined amount.

Two independently operating pilot valves were heretofore used to control the flow of pressure fluid to the pressure chamber in order to obtain a spread between the opening and closing pressure of the relief valve. These valves were spring loaded so that the pressure at which each valve opened depended not only upon certain area relationships, which were unchanging, but also upon its spring loading which was adjustable. Therefore, to adjust the "spread" of the relief valve (the controlled pressures at which it opened and closed), it was necessary to adjust two spring loadings. This adjustment was rather delicate when small spreads were desired and, due to variation in spring characteristics, each relief valve had to be individually adjusted even though all were to have the same spread. Also, since the pilot valves operated independently, if either got out of adjustment, the spread between opening and closing pressure of the relief valve would change, which would cause either an unnecessarily large loss of pressure fluid or an insufficient blow-down of pressure.

It is an object of this invention to provide a differential area type of relief valve and a pilot valve mechanism therefor which has a spread between the opening and the closing pressure of the relief valve determined solely by fixed area relationships and which cannot change after once being determined. While the pilot valve mechanism of the invention is spring loaded, it is not dependent upon spring loading to determine the spread.

It is a further object to provide such a relief valve and pilot valve mechanism in which the inlet valve and exhaust valve of the pilot are mechanically connected so that the opening of one causes the closing of the other, with the exhaust valve being so arranged that it will move from its closed position to its full open position and from full open position to closed position with a snap action, thereby providing the relief valve with a sharp, rather than mushy, opening and closing action.

These and other objects, features and advantages of the invention will appear or be apparent to one skilled in the art from a consideration of the specification, claims and attached drawings.

In the embodiment of the invention shown in the drawings, the relief valve has a pilot valve mechanism for controlling the flow of pressure fluid to and from the differential piston chamber of the relief valve which has a pilot exhaust valve and a pilot inlet valve arranged opposed to each other on the same central axis. Each of these pilot valves has a valve member and a valve seat and, since the valves are opposed to each other, the valve members move in opposite directions to close and open the valves. So that the valves will operate concomitantly, a spacer element is placed between the valve members which is long enough to hold one of the valve members off its seat when the other is closed and thus prevent the valves from closing simultaneously. Adjustable resilient means are provided to urge the pilot exhaust valve member toward its seat and, by means of the spacer element, to urge the pilot inlet valve member away from its seat. To obtain a spread between the opening and closing of the relief valve, the pilot inlet valve is provided with a larger effective pressure area than the pilot exhaust valve. By "effective area" is meant the area against which pressure on each side of the valve acts when the valve is closed to urge the valve either open or closed, as the case may be. With this arrangement, the pressure required to move the exhaust valve from its seat will be greater than the pressure at which the inlet valve will open, thus producing a differential, or spread, between the pressure of the fluid being controlled when the exhaust valve opens, allowing the relief valve to open and, the pressure of the fluid being controlled when the resilient means can again force the inlet valve open, allowing the pressure fluid to close the relief valve. Since the ratio of the effective pressure areas of the inlet and exhaust valves is constant, the spread between opening and closing of the relief valve is always a fixed percentage of the opening pressure, thus eliminating the need for separately adjusting two independently operated pilot valves.

To obtain the rapid and positive action desired in relief valves, a piston is connected to the pilot exhaust valve to help the valve overcome the force of the resilient means when the valve starts to open. The piston is provided with a larger effective area than that of the exhaust valve so that, immediately upon opening of the exhaust valve, the pressure of the fluid being controlled acts against this larger area, thereby greatly increasing the force acting against the resilient means, causing the exhaust valve to snap open. Since the pilot exhaust valve and the pilot inlet valve operate concomitantly, this produces the same "snap" action in the closing of the inlet valve.

"Snap" action is also obtained when the inlet valve opens and the exhaust valve closes. This is an additional beneficial result obtained by providing the inlet valve with an effective pressure area larger than that of the exhaust valve. Thus when the inlet valve is closed and the exhaust valve open, the controlled pressure acts against the effective area of the inlet valve holding the valve closed against the opening force exerted on the inlet valve by the resilient means. As the controlled pressure drops, due to the fact that the relief valve is open, the force it exerts against the effective area of the inlet valve decreases. When this force decreases to the point where the resilient means can overcome it and open the inlet valve, the effective area against which the controlled pressure acts to resist the resilient means shifts from that of the inlet valve to the effective area of the exhaust valve. Since the effective area of the exhaust valve is less than that of the inlet valve the force resisting the resilient means is immediately reduced by the ratio of the areas to an amount substantially below the amount necessary to resist the force of the resilient means thereby allowing the resilient means to "snap" the inlet valve open and the exhaust valve closed.

It is an additional feature of this invention to prevent any back pressure which may be present in the exhaust line leading from the pilot valve mechanism from affecting the opening and closing pressure of the pilot exhaust valve. This is accomplished by balancing the areas against which this pressure acts so that the net force result is zero.

It is a further feature of the invention to provide means for preventing pressure which may build up in the exhaust line of the relief valve for various reasons from inadvertently opening the relief valve. This is an important safety feature particularly when the relief valve is exhausting into the same line with other relief valves.

The invention will now be described in detail in connection with the accompanying drawings in which:

FIG. 1 is a vertical cross-sectional view through a differential piston type relief valve illustrating one embodiment of the invention;

FIG. 2 is an enlarged vertical cross-sectional view taken through the pilot valve mechanism of FIG. 1 showing the pilot exhaust valve closed and the pilot inlet valve open, which is the condition when the relief valve is closed; and FIG. 3 is a cross-sectional view similar to FIG. 2 illustrating the pilot valve mechanism when the pilot exhaust valve is open and the pilot inlet valve is closed, which is the condition when the relief valve is open and exhausting pressure fluid;

FIG. 4 is a vertical cross-sectional view through an alternate embodiment of the pilot mechanism in which the exhaust valve is provided with a seat comprising a thin, flat annular ring made from an elastomer;

FIG. 5 is an enlarged cross-sectional view through a portion of the exhaust valve of FIG. 4 showing the shape of the seat when the valve is closed and a pressure differential exists across the valve;

FIG. 6 is the same view as FIG. 5 showing the relative positions of the seat and the valve element just before the valve opens;

FIG. 7 is a cross-sectional view similar to FIG. 4 illustrating an alternate embodiment of the pilot mechanism in which the exhaust valve seat is a ring of circular cross-section made from an elastomer;

FIG. 8 is an enlarged cross-sectional view through a portion of the exhaust valve of FIG. 7 showing the shape of the seat when a pressure differential exists across the valve; and FIG. 9 is a view similar to FIG. 8 showing the relative positions of the seat and valve member just before the valve opens.

In the embodiment illustrated in FIGS. 1, 2 and 3, the pressure relief valve includes the body 10 which is provided with flanges 11 and 12 to connect it to a pressure vessel (not shown) and an exhaust line (not shown) respectively. It has an inlet passage 13 through which pressure fluid can enter and an outlet passage 14 through which pressure fluid is exhausted when the valve is open. Controlling the flow of fluid through the passages is a differential piston type valve which includes seat 15 and movable valve member 16 which is urged toward seat 15 by means of differential piston 17 attached thereto. The area of piston 17 is larger than the effective area of the opening in valve seat 15 so that when it is exposed to the same pressure as valve number 16, it will maintain the valve member seated and passage 13 closed.

Differential piston 17 is housed in chamber 18 and forms one wall thereof. To maintain the valve closed, the pressure in the chamber is maintained equal to the pressure acting on the valve member urging it open by connecting the chamber to inlet passage 13. The pressure fluid reaches the chamber through opening 19 in body 10 which intersects inlet passageway 13, check valve 20, through the pilot valve indicated generally by number 21, and into passageway 22 which leads to chamber 18. To open the relief valve, the pressure in chamber 18 is exhausted back through passageway 22, through the pilot valve, and out exhaust line 23.

To control the flow of pressure fluid into and out of chamber 18, the pilot valve is provided with means for maintaining in chamber 18 the pressure of the fluid being controlled and for exhausting the pressure fluid in the chamber when it reaches a predetermined pressure. In the embodiment illustrated, these means comprise two opposed valves, one for controlling flow of pressure fluid to the chamber and one for controlling flow of pressure fluid from the chamber, and means for operatively connecting the valves. The inlet valve includes ball 24 and seat 25 and the exhaust valve comprises ball 26 and seat 27. Ball type valves with hard seats, i.e., balls and seats made out of rigid, high strength material such as tungsten carbide, etc. are preferred as the ball makes line contact with the seat, making it possible to size the ball so that the line of force between the ball and the seat makes a large angle with the vertical axis of the valve which greatly increases the force the ball exerts on the seat thereby producing a tighter seal.

Located between the balls of the valves is a spacer 28 which is sufficiently long to insure that only one ball can be in engagement with its seat at any one time. Urging ball 26 of the pilot exhaust valve toward its seat is coil spring 29 which acts through valve stem 30. The downward force of spring 29 is in turn transmitted to ball 24 of the pilot inlet valve by spacer 28. Ball 24 is held adjacent seat 25 by spring 31 which is very weak, preferably having only sufficient strength to keep ball 24 in abutment with spacer 28 when the ball 24 is unseated, so that the force of the spring will have no practical effect on the opening and closing characteristics of the valve.

The pilot valve is illustrated in FIGS. 1 and 2, with the inlet valve open and the exhaust valve closed, allowing pressure fluid to flow into pressure chamber 18 and hold pressure relief valve element 16 against seat 15. The pressure fluid is also exerting an upward force on ball 26 tending to open the pilot exhaust valve. The total force exerted by the pressure is determined by the effective area of the exhaust valve. The amount of force necessary to open the exhaust valve depends on the force with which coil spring 29 holds the ball against its seat. In FIG. 3, the pilot exhaust valve is open and the inlet valve closed, stopping the flow of pressure fluid to chamber 18 and exhausting the pressure fluid in the chamber, thus allowing the relief valve to open. When the relief valve is open, the pressure fluid acts against ball 24 urging it against its seat. Here also, the total force holding the inlet valve closed is determined by the effective area of the inlet valve and the same force, the compression of spring 29, which resisted the opening of the exhaust valve now urges the inlet valve open by means of spacer 28. Therefore, once the proper amount of compressive force is placed in spring 29 so that the pilot exhaust valve opens at the desired pressure, the closing and opening pressure of the pilot inlet valve is determined also. In addition, since the pilot inlet and exhaust valves are controlled by the same means, a differential, or "spread," can be obtained between the pressure at which the pilot exhaust valve opens to exhaust the pressure in chamber 18 and the pressure at which the pilot inlet valve opens to repressure chamber 18 to close the pressure relief valve by providing the pilot exhaust valve with an effective area which is smaller than the effective area of the pilot inlet valve. Since the effective area of a valve is determined by the size of the components making up the valve, once the effective areas of these valves are established, their relationship will be fixed and the pressure at which the inlet valve will open will remain a fixed percentage of the opening pressure of the exhaust valve, regardless of the setting of spring 29.

To obtain a positive acting relief valve, i.e., one which opens quickly and positively when the pressure reaches a predetermined amount and which closes with the same type of action, means are provided to cause the pilot exhaust valve to open quickly and positively and to insure that it moves far enough to allow the pilot inlet valve to close. In the embodiment shown in FIGS. 1, 2, and 3, these means comprise a piston 32 with a cross-sectional area against which the pressure fluid can act which is larger than the effective area of the pilot exhaust valve. This piston is an integral part of steam 30 and is located directly above the exhaust valve so that it will be exposed to the pressure fluid immediately when the exhaust valve opens. By providing the piston against which the pressure fluid can act, and restricting the flow of fluid past the piston, the total force available to compress coil spring 29 is increased when the exhaust valve opens which results in ball 26 being moved rapidly away from its seat, opening the valve with a "snap" action. Seal 33 is provided to prevent flow of pressure fluid around the piston.

The flow of pressure fluid through the pilot exhaust valve must not be too greatly restricted, of course, since it is the purpose of the exhaust valve to exhaust this pressure fluid from chamber 18 to allow the pressure relief valve to open. Therefore, the flow of pressure fluid through the exhaust valve and into exhaust line 23 is merely restricted long enough to momentarily obtain the added upward force of pressure acting on the enlarged area of piston 32 to fully open the valve, after which time the pressure fluid can bleed down rapidly. This can be accomplished by providing the valve stem with bleed hole 34 which by-passes the piston. The by-pass is sufficiently small to restrict the flow of pressure fluid only long enough to allow it to exert its upward force on the valve stem and open the exhaust valve completely, after which the pressure will drop rapidly.

In many cases, relief valves of this type are subjected to considerable vibration, for example, when they are used to control the pressure in accumulation chambers mounted on air compressors. The hard exhaust valve member and seat used in the embodiments illustrated in FIGS. 1, 2 and 3 make more or less line contact with each other. Thus the area of contact is small and when one member strikes the other a hard blow the impact produces large stresses in both members adjacent the point of contact. This causes rapid failure of one or both of the valve members. Thus valve members of this type are usually not satisfactory for this type service due to their short life.

Illustrated in FIGS. 4 through 9 are two alternate embodiments of the pilot valve mechanism especially designed for service where the pilot valve will be subjected to intense vibration. In these embodiments, the hard ball and seat of the exhaust valve has been replaced with a "soft" seat made of resilient material, preferably one of the elastomers, so that the impact of the exhaust valve member against the seat can be absorbed by the resiliency of the seat. These embodiments have an additional feature in that means are provided to limit the distance the exhaust valve member can travel toward the seat. These means are provided to protect the seat when the pilot valve is not in service by keeping the seat from being subjected to the entire downward force of the resilient means used to urge the exhaust valve closed. Normally, of course, when the valve is in service, the downward force of the resilient means will be offset to a great extent by the upward force of the controlled pressure below the valve.

FIG. 4 illustrates one embodiment of the pilot inlet and exhaust valves wherein the exhaust valve has a soft seat. Also illustrated in this figure are the means for limiting the distance toward the seat the exhaust valve member can travel.

The exhaust valve is shown as comprising soft seat 50 and valve element 51. Valve seat 50 consists of a thin, flat annular ring of resilient material, preferably one of the elastomers. It is bonded to and supported by valve seat disc 52 located in opening 53 which extends through body 54 of the pilot valve mechanism and in which the exhaust and inlet valves are located. Below disc 52 is another annular member 55 which serves to space disc 52 of the exhaust valve from valve seat 56 of the inlet valve. Member 55 is provided with axial opening 57 and lateral openings 58 to provide a passageway between the exhaust valve and the inlet valve and also between the valves and opening 59 in the valve body which connects the pressure chamber of the relief valve to the pilot valve.

Located between exhaust valve element 51 and ball 60 of the inlet valve is spacer member 61 which functions in exactly the same way as does spacer 28 in the embodiment described in connection with FIGS. 1, 2 and 3. That is, it serves to transmit the force of the resilient means (not shown in FIG. 4) from the exhaust valve member to the inlet valve member and also to insure that the valves do not close simultaneously.

Exhaust valve member 51 is located in guide member 62 which rests on the exhaust valve seat disc 52 and has an annular shoulder 63 arranged to engage the outwardly extending flange 64 attached to the upper end of exhaust valve member 51. Between guide member 62 and the exhaust valve seat disc 52 are shims 65 which are used to adjust the distance between annular shoulder 63 and valve seat 50 to limit the distance valve member 51 can penetrate the relatively soft resilient material of seat 50. As explained above, generally, flange 64 will not engage shoulder 63 when the valve is in operation as the controlled pressure within the pilot valve acting on the valve member 51 will offset much of the downward force of the resilient means. However, when the pilot valve is not in operation, there is no pressure to offset the force of the resilient means and thus the distance that the valve member 51 can travel toward the seat 50 must be limited. Otherwise, it may damage the seat.

The upper end of valve member 51 is provided with a recess 66 in which ball 67 is located which engages valve stem 68 and transmits the downward force of the resilient means (not shown) to valve element 51 and to exhaust valve element 60 through spacer 61. Valve element 51 is also provided with a downwardly facing annular shoulder 69 which functions in the same manner as did the enlarged area 32 on valve stem 30 in the embodiment previously described. That is, it provides an enlarged area against which the control pressure can act when the exhaust valve opens to increase the upward force on the exhaust valve element, causing it to move open rapidly with a "snap" action. When the exhaust valve opens, control pressure can escape through openings 70 and also up between valve element 51 and guide 62 and out an opening provided therefor in the pilot valve housing. These passageways and openings are preferably designed to restrict the flow of pressure fluid sufficiently to cause it to exert a force on the shoulder 69 and "snap" the valve open before it is exhausted.

FIGS. 5 and 6 respectively show the exhaust valve in its closed position and in its position at the moment it opens. In order that the effective area of the exhaust valve can be fairly accurately determined, the area of the valve element in engagement with the valve seat should be maintained at a minimum. This also increases the unit force between the valve seat and valve element and improves the seal thereby obtained between these two members. Thus, the lower end of valve element 51 is provided with a downwardly extending annular flange 51a which is provided with downwardly converging sides so that the area of the end of the flange member 51a is a minimum. This area cannot be too small, of course, as otherwise it would cut through the material of the valve seat and destroy the effectiveness of the valve. However, as stated above, it should be held to a minimum.

The diameter of flange member 51a is preferably such that a considerable amount of valve disc 50 is encompassed within the valve member and eexposed to the controlled pressure. In this way, when the valve is closed as illustrated in FIG. 5, the valve member will depress the resilient material of the valve seat directly beneath it in the manner illustrated. Also the controlled pressure will exert both a downward force and a lateral force on that portion of the seat within the valve member causing it to flow laterally outward in the direction of the valve element 51a. The valve member, of course, acts as a dam and resists the outward flow of the resilient material causing it to accumulate adjacent the inside surface of the flange 51a in the manner illustrated in FIG. 5. This bulge of material adjacent the end of the valve member extends up along the inside of the valve element and is forced into sealing engagement with the valve element by the controlled pressure. This seal will be maintained as the valve member moves away from the seat until the end of the valve element is far enough above the seat to allow this bulge of material to flow under the valve element. At this point the valve is open. The action of this bulge of resilient material, however, allows the valve element to move a considerable distance away from the seat before the flow of pressure fluid through the valve can begin. This reduces the velocity of the fluid through the valve when it opens, which greatly lengthens the life of the valve.

An alternate embodiment of an exhaust valve having a soft seat is illustrated in FIG. 7. In this embodiment, instead of using a thin, flat annular disc of resilient material, a seat having a circular cross section in the manner of a conventional O-ring is used. Also the valve element has been modified to eliminate the downwardly extending flange 51a. The valve element indicated by the number 71 in this case is simply provided with a flat bottom and relatively sharp corners 71a which are provided with a short radius to keep the corners from cutting into the resilient material of the seat 72. In this embodiment, soft seat 72 is supported by seat retainer 73 which has an upwardly extending portion 74 of reduced outside diameter which combines with an inwardly extending portion 76 on the lower end of guide 75 to hold seat 72 in position. The outer surface of portion 74 of the seat retainer and the inner surface of portion 76 of guide 75 are curved so that they combine to provide an approximately circular annular space within which seat 72 can be retained.

Portion 76 of the guide has an inner diameter slightly larger than the outside diameter of the lower portion of the valve element so that the clearance between the two is such that the seat cannot be extruded through the opening by the controlled pressure. Preferably this clearance should be in conformity with good standard O-ring groove design.

As shown in FIG. 8, when the valve is closed and a pressure differential exists across the valve, there will be a portion of the valve seat which is forced into the space between the guide and the lower end of the valve element. This portion of the seat, indicated by the number 77, which is extruded into this space serves to perform the same function as the bulge 50a did in the embodiment illustrated in FIG. 4. As shown in FIG. 9, as the valve element moves from its closed position to the point where the valve is opening, the extruded portion of the valve seat continues to maintain a sealing engagement with the valve element until the valve element is clear of the highest point where extrusion has occurred and this allows the valve element to move a substantial distance toward its open position before breaking sealing engagement with the valve seat. Of course, immediately upon opening of the valve, the pressure will force the resilient valve seat away from the valve element, immediately opening a considerable gap between it and the seat. Thus, as was the case in the embodiment above, shown in FIG. 4, the velocity of the fluid flowing through the valve just as it opens is less than it would be otherwise which results in a longer life for the valve.

As shown in FIGS. 1, 2 and 3, located below the pilot inlet valve of the pilot valve mechanism is a screen 35 which filters all incoming pressure fluid to prevent any debris from entering the valve chambers of the pilot mechanism and interfere with their operation. This screen 35 is carried by a cylindrical member 36 which is free to move toward ball 24 of the inlet pilot valve. Appropriate seals 37 are provided to insure that all pressure fluid passes through the screen. With member 36 free to move toward ball 24, should screen 35 become clogged with debris so that the flow of pressure fluid into the pilot valve mechanism is restricted or stopped, the pressure fluid will exert an upward force on screen 35 moving cylindrical member 36 into engagement with ball 24, urging it toward its seat. Should the screen become so clogged that the pressure drop across the screen is significant, it will force the pilot inlet valve closed which will open the pilot exhaust valve and the relief valve. This is a desirable safety feature. It eliminates the possibility of a clogged screen causing the pilot valve not to function and in turn allowing the pressure to build up dangerously high in the pressure vessel being controlled. Also, by forcing the exhaust valve open, which in turn allows the pressure relief valve to open, the operator will be signaled that something is wrong and will investigate to determine why his pressure relief valve remains open.

Since, in many installations, these pressure relief valves are installed so that the exhaust from passageway 14 of the relief valve and from exhaust line 23 of the pilot valve lead to a common header connected to other relief valves, it is important that back pressure in these lines does not change the opening characteristics of the exhaust valve. To eliminate any possibility of this, the diameter of valve stem 30 engaged by seal 38, which seals spring housing 39 from the exhaust line, is such that the cross-sectional area of the stem against which the pressure fluid acts is equal to the effective area of the exhaust valve. With this arrangement, any pressure existing in exhaust line 23 will exert an upward force on the valve stem equal to the downward force it exerts against ball 26, thus balancing out the force which it produces and therefore having a net effect of zero on the opening characteristics of the exhaust valve.

The opening pressure of the relief valve is adjusted by changing the amount of compression placed in spring 29. Spring housing 39 and spring cap 40 are provided with interengaging threads to allow this to be done conveniently by rotating the spring cap in one direction or the other. Lock nut 41 is provided to hold the spring cap in position once the proper setting of the spring is obtained.

To allow the manual blow-down of the pressure vessel to which the relief valve is connected, an opening 42 is provided between the two pilot valves. As shown the opening is closed by plug 43 which can be removed any time it is desired to manually open the relief valve. If this is to be a frequent occurrence, a short line and a valve could be connected to the opening to make manual operation easier.

In many instances several relief valves are connected into the same discharge line. Since each valve usually controls the pressure in different tanks, there will be occasions when there will be little if any pressure in one or more of the tanks. When these conditions exist, should one of the other relief valves open to lower the pressure in the tank it is controlling, the pressure fluid discharged therefrom could enter the exhaust passage 14 of the other relief valves and exert a pressure on the underside of differential pistons 17 and valve elements 16. If the pressure in chamber 18 of one of these valves happened to be low then the pressure fluid being exhausted from another tank could open the relief valve and flow into the tank to which it is connected.

This is undesirable so to insure that it doesn't occur exhaust passage 14 is connected to chamber 18 by means of line 80. Check valve 81 is located in line 80 to allow fluid to flow from passage 14 into chamber 18 but not in the other direction. Line 80 thus insures that the pressure in passage 14 will never exceed the pressure in chamber 18 eliminating any danger of the valve being opened inadvertently.

There may be occasions when it will be desirable to have the pressure fluid supplied to the pilot valve from another source, for example, another pressure vessel. This can be done by removing plug 82, closing off passageway 19 by means of a plug screwed in threads 83, and connecting the line from the other vessel to the pilot valve by means of the threads which held plug 82 in place.

It may also be desirable to provide remote controlled means for overriding the pilot valve and opening the relief valve. This can be done by providing an additional exhaust line 84 controlled by a remote controller such as a solenoid operated valve which can exhaust the pressure fluid in chamber 18 faster than it can be supplied thereto through the pilot valve. In this manner, the remote controller can open the relief valve at any time it is desired.

OPERATION

To more fully explain the features and characteristics of the above-described structure, a complete cycle of operation of the pilot valve mechanism will be described. In FIG. 1, the pressure relief valve is closed and the pressure fluid being controlled is exerting an upward force on valve member 16 across the effective area of valve seat 15 which is opposed by the downward force of this same pressure fluid acting on the area of piston 17 in differential piston chamber 18. The pressure fluid has access to pressure chamber 18 through opening 19 in body 10 through the pilot inlet valve and passageway 22. The pilot inlet valve is held open and the pilot exhaust valve is held closed by spring 29 acting through stem 30 and spacer 28.

When the pressure of the fluid being controlled rises to the point where it is able to force ball 26 of the pilot exhaust valve away from its seat 27, pressure fluid will immediately pass through the axhaust valve and exert an upward force on piston 32. Since the cross-sectional area of the piston is larger than the effective area of the exhaust valve, the force generated by the pressure fluid immediately further compresses spring 29, opening the pilot exhaust valve with a "snap" action. As exhaust valve ball 26 moves away from its seat, spacer 28 permits inlet valve ball 24 to engage its seat 25 and close the pilot inlet valve. This valve closes with the same snap action that the exhaust valve opens. These conditions are shown in FIG. 3. The pressure fluid in chamber 18 can now escape through exhaust line 23, reducing the pressure acting against piston 17 sufficiently to allow the pressure of the fluid being controlled to force valve member 16 away from valve seat 15, opening the pressure relief valve.

The pressure relief valve will remain open until the pressure in the pressure vessel to which it is attached has been lowered a predetermined amount which is determined by the point at which spring 29 is able to overcome the upward force of the pressure of the fluid being controlled acting over the effective area of the pilot inlet valve.

As explained above, the effective area of seat 25 of the pilot inlet valve is larger than the effective area of the pilot exhaust valve. Thus, the pressure necessary to open the exhaust valve is higher than the pressure which is able to hold the inlet valve closed. Therefore, the pressure of the fluid being controlled must drop to some point below that at which it opened the exhaust valve before the inlet valve will open. How much the pressure will drop will depend on the ratio of the effective area of the exhaust valve to that of the inlet valve. For example, if the effective area of the exhaust valve is 80% of the effective area of the inlet valve, then the closing pressure of the pressure relief valve will be 80% of its opening pressure.

This difference in the effective area of these valves also produces a rapid closing action for the relief valve. When the pressure of the fluid being controlled has declined sufficiently for coil spring 29 to force ball 24 off it seat, opening the pilot inlet valve, the force holding the exhaust valve open immediately drops from the force exerted by the pressure fluid acting over the effective area of the inlet valve to the force exerted by the pressure fluid acting over the effective area of the exhaust valve, which is a considerable drop in force which allows spring 29 to immediately snap the exhaust valve closed and completely open the inlet valve. The pressure then quickly builds up in chamber 18, causing rapid closing of the pressure relief valve itself.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. As a subcombination, a pilot valve adapted to admit and release pressure fluid into a pressure chamber in response to the pressure of the fluid, comprising, in combination, a housing having a bore, an inlet port, an exhaust port and an intermediate port connecting the bore with the pressure chamber, an inlet valve in the bore between the inlet port and the intermediate port to control the flow of pressure fluid to the pressure chamber, an exhaust valve located between the intermediate port and the exhaust port to control the flow of pressure fluid from the pressure chamber, each valve having a valve member and a valve seat with the inlet valve having an effective area exposed to pressure fluid larger than the exhaust valve, said exhaust valve seat being a flat, relatively thin, annular ring made of elastomer material and the valve element having a flange portion with sides converging toward its end to provide a surface for engaging the flat side of the seat, said surface having a relatively small area as compared to the area of the flat side of the seat and having a diameter substantially larger than the inside diameter of the seat to allow upstream pressure to act on the portion of the seat inside the flange of the valve element and cause it to flow against the flange and increase the area of the seal between the seat and the flange, stop means to limit the distance the valve element of the exhaust valve can travel toward the exhaust valve seat, resilient means urging the exhaust valve closed, and means interconnecting the valve member of both valves to prevent the valves from being closed simultaneously.

2. In a pressure relief valve for controlling a pressure system, a casing having a pressure inlet port and a pressure outlet port, a valve member and a valve seat in said casing, said valve member being located downstream of said valve seat and movable into engagement therewith to stop the flow of pressure fluid from the inlet port to the outlet port, pressure responsive means connected to the valve member, means for supplying pressure fluid to the pressure responsive means to urge the valve member to a seated position, said pressure responsive means having an area upon which said pressure fluid acts to urge the valve member toward the valve seat that is at least slightly greater than the area of the valve seat, pilot means for relieving the pressure in the pressure responsive means upon the occurrence of a predetermined opening pressure in the system being controlled and for again admitting pressure fluid to the pressure responsive means when the pressure in the system being controlled drops a predetermined percentage of the opening pressure, said pilot means comprising a chamber connected to the pressure responsive means, an inlet valve connecting the chamber with the pressure fluid being regulated, and an exhaust valve located opposite the inlet valve, each having a valve seat and a valve member with the valve member of each valve moving in opposite directions to open, and with the valve seat of the inlet valve arranged to engage its valve member and stop its travel in one direction when the inlet valve closes, the valve seat and valve member of the inlet valve having a larger exposed pressure area than does the exhaust valve seat and the valve member, means for preventing the valves from being closed simultaneously, resilient means urging the exhaust valve closed and the inlet valve open, and means for connecting the pressure outlet port of the relief valve with the chamber connected to the pressure responsive means including check valve means for allowing pressure fluid to flow into the chamber from the discharge port and to prevent pressure fluid from flowing in the opposite direction.

3. In a pressure relief valve for controlling a pressure system, a casing having a pressure inlet port and a pressure outlet port, a valve member and a valve seat in said casing, said valve member being located downstream of said valve seat and movable into engagement therewith to stop the flow of pressure fluid from the inlet port to the outlet port pressure responsive means connected to the valve member, means for supplying pressure fluid to the pressure responsive means to urge the valve member to a seated position, said pressure responsive means having an area upon which said pressure fluid acts to urge the valve member toward the valve seat that is at least slightly greater than the area of the valve seat, pilot means for relieving the pressure in the pressure responsive means upon the occurrence of a predetermined opening pressure in the system being controlled and for again admitting pressure fluid to the pressure responsive means when the pressure in the system being controlled drops a predetermined percentage of the opening pressure, said pilot means comprising a chamber connected to the pressure responsive means, an inlet valve connecting the chamber with the pressure fluid being regulated, and an exhaust valve located opposite the inlet valve, each having a valve seat and a valve member with the valve member of each valve moving in opposite directions to open, and with the valve seat of the inlet valve arranged to engage its valve member and stop its travel in one direction when the inlet valve closes, the valve seat and valve member of the inlet valve having a larger exposed pressure area than does the exhaust valve seat and the valve member, means for preventing the valves from being closed simultaneously, and resilient means urging the exhaust valve closed and the inlet valve open, said pilot means being further provided with a filter for preventing debris from entering the chamber in the pilot means, the filter being located to filter all pressure fluid entering the inlet valve, means mounting the filter for movement toward the valve member of the inlet valve, and means for transmitting to the valve member to urge it toward the valve seat the force exerted on the filter by reason of any pressure differential existing across the filter due to its filtering action.

References Cited by the Examiner

UNITED STATES PATENTS

| 868,030 | 10/1907 | Tanner et al. | 137—492 |
| 2,397,117 | 3/1946 | Ashton et al. | 137—108 |
| 2,447,820 | 8/1948 | Schultz | 137—108 |
| 2,649,115 | 8/1953 | Deardorff | 137—108 X |
| 2,890,714 | 6/1959 | Greenwood et al. | 137—491 |
| 2,946,341 | 7/1960 | Sullivan | 137—496 X |

FOREIGN PATENTS

| 267,978 | 6/1927 | Great Britain. |
| 782,594 | 9/1957 | Great Britain. |

M. CARY NELSON, *Primary Examiner.*

MARTIN P. SCHWADRON, *Examiner.*

R. J. MILLER, *Assistant Examiner.*